(12) United States Patent
Yamamoto et al.

(10) Patent No.: US 8,582,268 B2
(45) Date of Patent: Nov. 12, 2013

(54) CIRCUIT FOR PREVENTING INRUSH CURRENT

(75) Inventors: Yudai Yamamoto, Ehime (JP); Akeyuki Komatsu, Ehime (JP)

(73) Assignee: Panasonic Corporation, Osaka (JP)

( * ) Notice: Subject to any disclaimer, the term of this patent is extended or adjusted under 35 U.S.C. 154(b) by 510 days.

(21) Appl. No.: 12/991,850

(22) PCT Filed: Apr. 16, 2009

(86) PCT No.: PCT/JP2009/001753
§ 371 (c)(1),
(2), (4) Date: Nov. 9, 2010

(87) PCT Pub. No.: WO2009/144872
PCT Pub. Date: Dec. 3, 2009

(65) Prior Publication Data
US 2011/0069422 A1    Mar. 24, 2011

(30) Foreign Application Priority Data

May 30, 2008    (JP) .................................. 2008-141779

(51) Int. Cl.
*H02H 7/00*    (2006.01)
(52) U.S. Cl.
USPC ........................................................ 361/93.9

(58) Field of Classification Search
USPC .......................................................... 361/93.9
See application file for complete search history.

(56) References Cited

U.S. PATENT DOCUMENTS 5,250,891 A  * 10/1993 Glasgow ....................... 320/140

FOREIGN PATENT DOCUMENTS

| JP | 07-212969 | 8/1995 |
| JP | 07-284272 | 10/1995 |
| JP | 08-085334 | 4/1996 |
| JP | 11-252920 | 9/1999 |
| JP | 2000-350457 | 12/2000 |
| JP | 2001-037291 | 2/2001 |
| JP | 2001-218471 | 8/2001 |
| JP | 2007-124813 | 5/2007 |

* cited by examiner

*Primary Examiner* — Stephen W Jackson
(74) *Attorney, Agent, or Firm* — Hamre, Schumann, Mueller & Larson, P.C.

(57) ABSTRACT

An open magnetic circuit coil (6) is arranged on a line connecting a battery (1) to a charger (CH1). Furthermore, a resistor (2) is connected in series with a large-capacitance electrolytic capacitor (7) for smoothing a charger output which is connected to the output of the charger (CH1). This can suppress an abrupt change in current flowing in the connection line between the battery (1) and the charger (CH1) in connection between plugs (3a, 3b).

6 Claims, 5 Drawing Sheets

FIG. 3
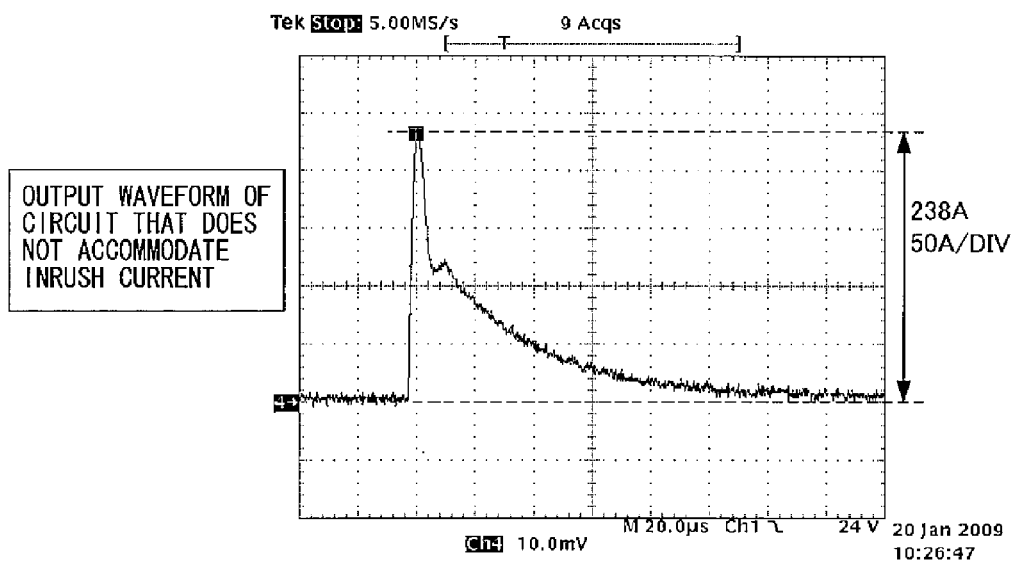
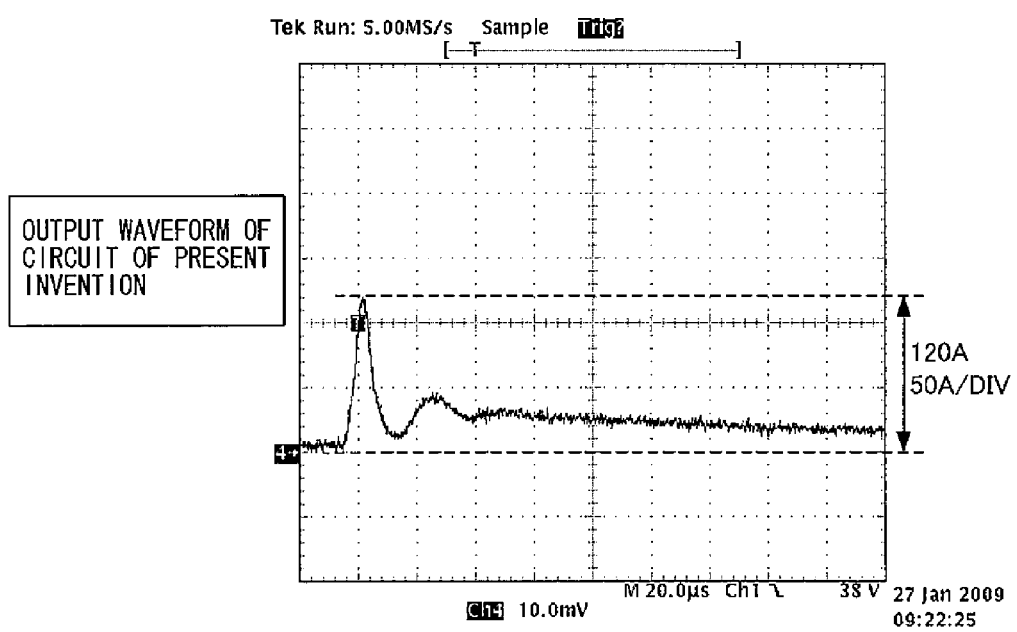

TOP VIEW

SIDE VIEW

CIRCUIT FOR PREVENTING INRUSH CURRENT

TECHNICAL FIELD

The present invention relates to a charger for charging, for example, a lead storage battery, and a circuit for preventing inrush current, the circuit preventing inrush current generated in connection between the battery and the charger.

BACKGROUND ART

Conventionally, in a charger for charging, for example, a lead storage battery, or a load to which power is supplied from a battery, a circuit for preventing inrush current is provided between the battery and a device connected to the battery. This circuit functions to prevent damage to the contact portion of a plug due to inrush current or sparks generated by a voltage difference between the charger or a capacitor for removing a high frequency component and the battery in connection between the battery and the charger or between the battery and the load, the capacitor being connected in parallel with the road.

The above conventional circuit for preventing inrush current is described below with reference to the drawings.

As a conventional technique (for example, see Patent Document 1), FIG. 6 is a circuit diagram of the conventional circuit for preventing inrush current in which power is supplied from a battery 1 via a contact portion including plugs 3a and 3b to a load F1 across which an electrolytic capacitor 7 is connected in parallel. The plugs 3a and 3b of the contact portion are detachably connected.

Resistors 2a and 2b are always connected in parallel to the plugs 3a and 3b of the contact portion as shown in FIG. 6. Even if the plugs 3a and 3b of the contact portion are not connected, the battery 1 continuously charges the electrolytic capacitor 7 via the resistors 2a and 2b to eliminate a voltage difference between the battery 1 and the electrolytic capacitor 7. This prevents inrush current generated when the plugs 3a and 3b of the contact portion are connected.

Further, as shown in FIG. 7, there is a technique in which a resistor 2c and a switch 5a that causes a short circuit in the resistor 2c are provided between the plugs 3a and 3b and the electrolytic capacitor 7 connected in parallel across the load F1. In this technique, when the plugs 3a and 3b are connected, the electrolytic capacitor 7 is charged via the resistor 2c, and after the electrolytic capacitor 7 is charged, the switch 5a is closed to cause a short circuit in the resistor 2c.

Moreover, there is another conventional technique (for example, see Patent Document 2). In this technique, as shown in FIG. 8, a closed magnetic circuit coil 6 is provided between a battery 1 and an electrolytic capacitor 7 to suppress an abrupt change in current by the inductance component of the coil 6, and prevent inrush current when a switch 5b is closed with a large voltage difference between the battery 1 and the electrolytic capacitor 7.

CITATION LIST

Patent Document

Patent Document 1: Japanese Patent Laid-Open No. 2001-037291
Patent Document 2: Japanese Patent Laid-Open No. 1996-085334

DISCLOSURE OF THE INVENTION

Problems to be Solved by the Invention

However, in the conventional configurations, in FIG. 6, an electrical device (load F1) including the electrolytic capacitor 7 needs to always be connected with the battery 1 to continuously charge the electrolytic capacitor 7. Even when the plugs 3a and 3b are not connected, the battery 1 cannot be completely disconnected, and thus the resistors 2a and 2b consume unnecessary power. Further, the resistors 2a and 2b also require connectors or the like to completely disconnect the battery from the charger for replacement of the battery.

Meanwhile, in FIG. 7, in a normal operation other than the connection between the plugs 3a and 3b, the switch 5a needs to be closed to prevent the power consumption of the resistor 2c. Further, a circuit for controlling the switch 5a needs to be separately provided, or the switch 5a needs to be manually closed after inrush current stops flowing.

In FIG. 8, the closed magnetic circuit coil 6 is used. When a large-capacitance battery is used, a large inrush current easily saturates the coil, and in this case, the inrush current cannot be prevented.

The present invention solves the above-described conventional problems, and has an object to provide a circuit for preventing inrush current that can completely disconnect a battery from a charger circuit only by connecting and disconnecting plugs and can satisfactorily prevent inrush current without a switch operation.

Means for Solving the Problems

To achieve the above-described object, the present invention provides a circuit for preventing inrush current that prevents inrush current generated in connection between a battery and a charger, the charger being connected to the battery via a contact portion to charge the battery through the contact portion, the circuit including: between the charger and the contact portion, a series circuit including a resistor and a capacitor, the series circuit being connected in parallel with the output end of the charger; and between the charger and the contact portion, a coil connected to the output end of the charger in series with the battery.

The present invention also provides a circuit for preventing inrush current that prevents inrush current generated in connection between a battery and a load, the load being connected to the battery via a contact portion and receiving power from the battery through the contact portion, the circuit including: between the load and the contact portion, a series circuit including a resistor and a capacitor, the series circuit being connected in parallel with the power supply end of the load; and between the charger and the contact portion, a coil connected to the power supply end of the load in series with the battery.

Advantage of the Invention

According to the present invention, even if there is a large voltage difference between a battery and a large-capacitance smoothing capacitor in the connection of plugs, an abrupt change in current can be suppressed without previously charging the capacitor through a resistor.

Thus, the battery can be completely disconnected from a charger by the plugs, and further, damage to the contact portion of the plugs due to inrush current and sparks can be significantly reduced without requiring a switch operation.

Further, a device connected to the battery can be operated with more stable voltage and current than those of a general circuit that does not accommodate inrush current.

BRIEF DESCRIPTION OF THE DRAWINGS

FIG. 3 shows the inrush current waveforms of the present invention and the general battery charger that does not accommodate inrush current;

BEST MODE FOR CARRYING OUT THE INVENTION

Now, a circuit for preventing inrush current according to an embodiment of the present invention will be specifically described with reference to the drawings.

Figure 1:
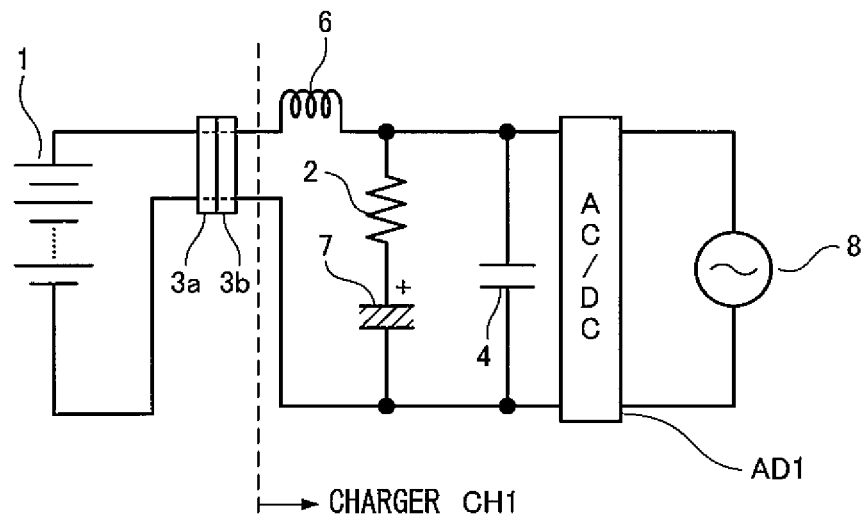
FIG. 1 is a circuit diagram showing the configuration of a circuit for preventing inrush current according to an embodiment of the present invention.

FIG. 1 is a circuit diagram showing the configuration of the circuit for preventing inrush current according to this embodiment.

First, the circuit configuration of FIG. 1 will be described. As shown in FIG. 1, for example, the two terminals of a battery 1 such as a lead storage battery that can be charged are connected to the two terminals of a plug 3a. The output terminals of a charger CH1 are connected to a plug 3b that is paired with the plug 3a to constitute a contact portion. A coil 6 is connected to one of the output terminals of the charger CH1. Downstream of the coil 6, an electrolytic capacitor (large-capacitance capacitor) 7 and a film capacitor (small-capacitance capacitor) 4 are connected in parallel as capacitors for smoothing the output of the charger CH1. A resistor 2 is connected in series with the electrolytic capacitor 7.

In the above-described circuit configuration, a series circuit including the resistor 2 and the electrolytic capacitor 7 which is connected in parallel with the output end of the charger CH1, and the coil 6 connected to the output end of the charger CH1 in series with the battery 1 constitute the circuit for preventing inrush current of this embodiment.

For example, the values of elements when charging a battery that output 72 V are 1.3Ω of the resistor 2, 3 µH and 4 mΩ of the coil 6, 100 µF of the electrolytic capacitor 7, and 6 µF of the film capacitor 4.

In FIG. 1, the charger CH1 includes an AC/DC converter AD1, the series circuit including the resistor 2 and the electrolytic capacitor 7 which is connected in parallel with the side of the output end of the AC/DC converter AD1, the capacitor 4 which is connected in parallel with the side of the output end of the AC/DC converter AD1 and the coil 6 connected in series with the output end, and an AC power supply 8 as the output power source of the charger CH1 is connected to the input end of the AC/DC converter AD1.

Next, an inrush current preventing function in FIG. 1 will be described.

In the case where the terminal voltage of the large-capacitance electrolytic capacitor 7 is higher than the voltage of the battery 1 when the plug 3a on the side of the battery 1 and the plug 3b on the side of the charger CH1 are connected to charge the battery 1 from the charger CH1 through the plugs 3a and 3b in the contact portion, inrush current is about to flow for discharging electric charges charged in the electrolytic capacitor 7 in the direction of the electrolytic capacitor 7, the resistor 2, the coil 6, the plugs 3b and 3a, and the battery 1. When the voltage of the battery 1 is higher than the terminal voltage of the electrolytic capacitor 7, inrush current is about to flow for charging the electrolytic capacitor 7 in the direction of the battery 1, the plugs 3a and 3b, the coil 6, the resistor 2, and the electrolytic capacitor 7.

Thus, the self-induction reaction of the coil 6 increases the impedance of the coil for an abrupt change in current, and inrush current discharged from or charged in the electrolytic capacitor 7 is limited by not only the resistor 2 but also the coil 6, thereby reducing the inrush current by half as shown in FIG. 3.

Figure 2:
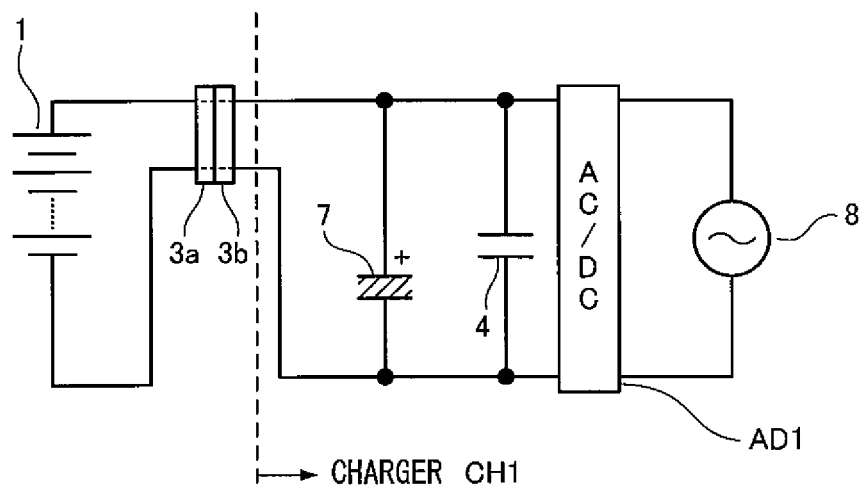
FIG. 2 is a circuit diagram of a general battery charger that does not accommodate inrush current.

FIG. 3 shows current waveforms actually confirmed by an experiment conducted at a voltage across the electrolytic capacitor 7 of 0 V and a voltage of the battery 1 of 72 V. It was confirmed that in the general circuit that does not accommodate inrush current as shown in FIG. 2, inrush current in the connection of plugs was 238 A, while in the circuit that accommodates inrush current as shown in FIG. 1, inrush current was reduced substantially by half to 120 A.

This can prevent sparks generated in the plugs 3a and 3b in the connection therebetween, and prevent damage to the connecting portion including the plugs 3a and 3b due to sparks.

As described above, even if there is a voltage difference between the battery 1 and the capacitor 4, there is no need for always charging the capacitor 4 via the resistor as in the conventional technique to prevent inrush current caused by the voltage difference, and there is no need for controlling a short circuit in the resistor by a switch 5a after the connection between the plugs 3a and 3b, so that inrush current cab be reliably reduced.

Figure 5:
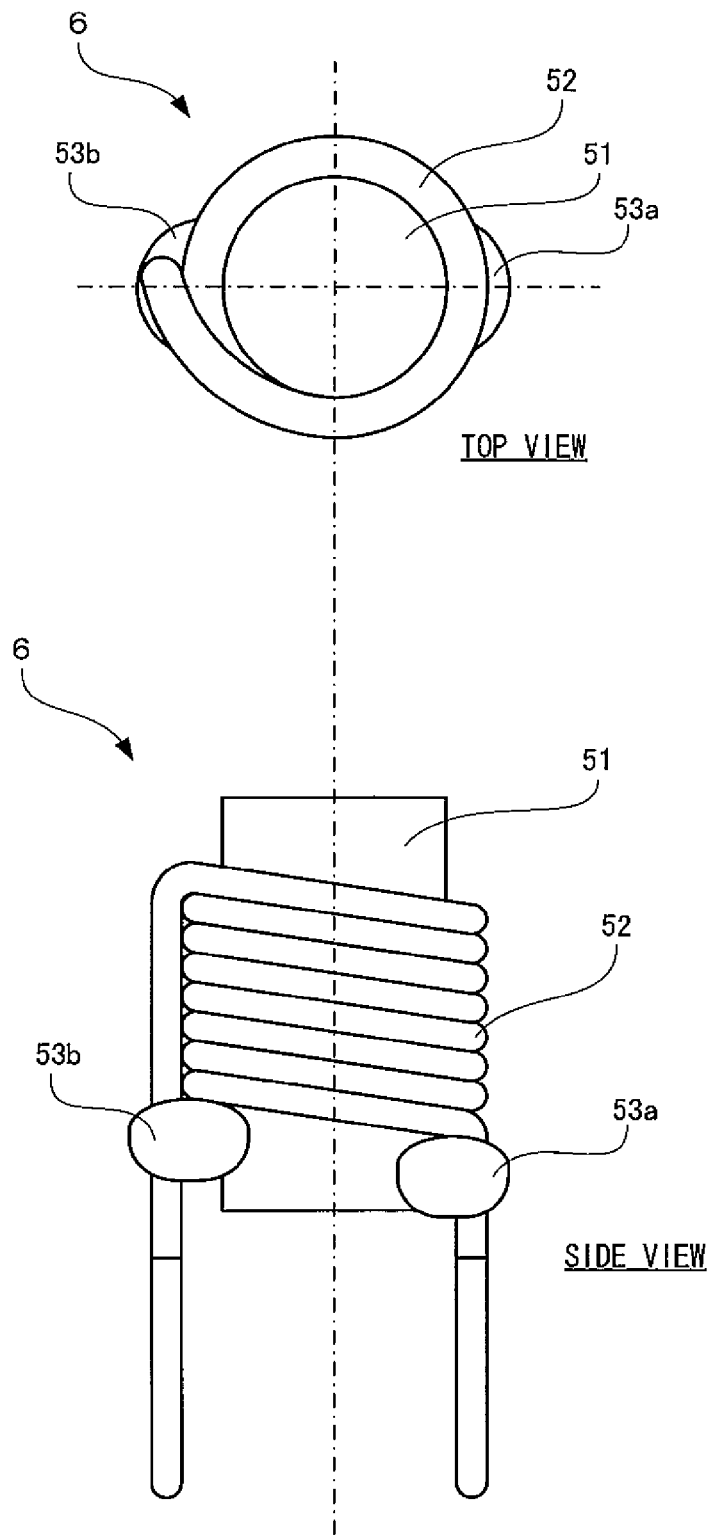
FIG. 5 shows an example of an open magnetic circuit coil suitable for a coil 6.
Figure 6:
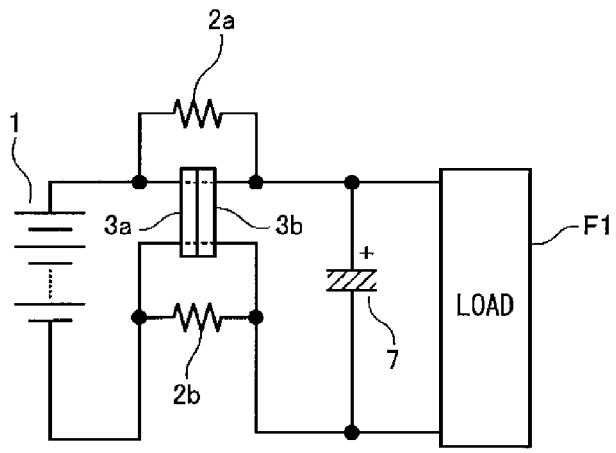
FIG. 6 is a circuit diagram 1 showing an exemplary configuration of a conventional circuit for preventing inrush current.
Figure 7:
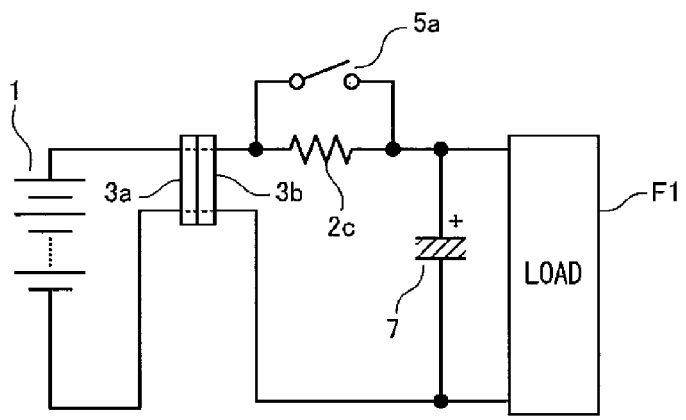
FIG. 7 is a circuit diagram 2 showing an exemplary configuration of another conventional circuit for preventing inrush current.
Figure 8:
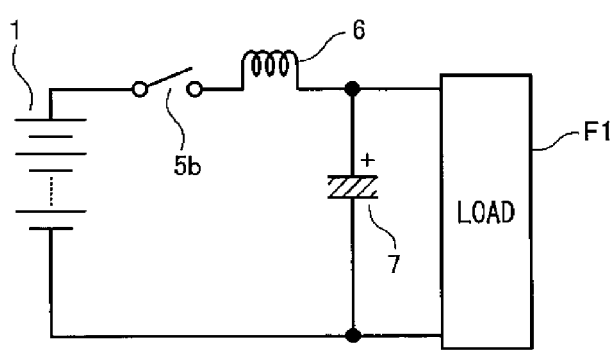
FIG. 8 is a circuit diagram 3 showing an exemplary configuration of the other conventional circuit for preventing inrush current.

An open magnetic circuit coil of FIG. 5 is suitable for the coil 6. The open magnetic circuit coil does not easily cause the saturation of a magnetic flux in a core even if inrush current flows which is excessively larger than general charging current. As shown in FIG. 5, the coil 6 is formed by winding a winding 52 around a cylindrical core 51, and securing the opposite ends of the winding 52 to the core 51 by adhesives 53a and 53b, respectively.

Next, a normal operation when the battery is charged by the charger will be described.

In a normal operation, in the circuit that does not accommodate inrush current as shown in FIG. 2, the electrolytic capacitor 7 and the capacitor 4 remove the high frequency component of the AD1 output to stabilize voltage and current supplied to the battery.

In the circuit for preventing inrush current of this embodiment, as shown in FIG. 1, the resistor 2 is connected in series with the electrolytic capacitor 7, and thus a smoothing action that is the original function of the electrolytic capacitor 7 is impaired. However, in this embodiment, the coil 6 is connected to the output end of the charger, and thus the inductance component of the coil 6 removes the high frequency component of the charger output, thereby allowing the battery to be charged with stable voltage and current in a normal time for charging the battery.

Figure 4:
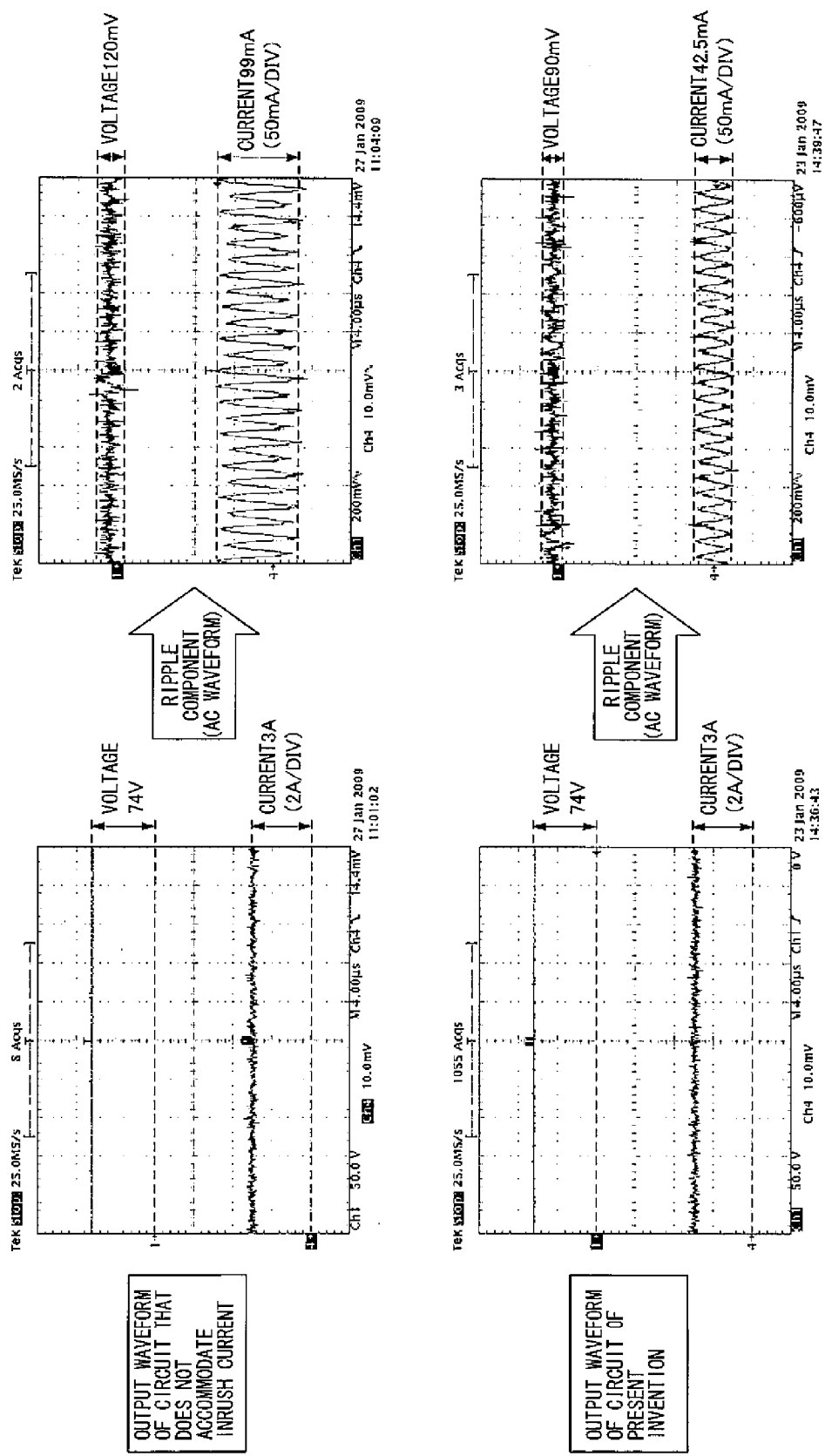
FIG. 4 shows the charging waveforms of the present invention and the general battery charger that does not accommodate inrush current.

FIG. 4 shows charger output waveforms when the battery of 72 V is charged with a current of 3 A.

As shown in FIG. 4, as compared with a general circuit that does not consider preventing inrush current, for the amplitude of a ripple component, the voltage value can be reduced from 120 mV to 90 mV, and the current value can be reduced from 99 mA to 42.5 mA. Thus, it can be confirmed that the battery can be charged with more stable voltage and current.

Thus, in this embodiment, inrush current can be prevented, and also in a charging operation for charging the battery with the charger, more stable power can be supplied than in a circuit to which the present invention is not applied.

In the above-described embodiment, the case of the connection between the battery 1 and the charger CH1 including the capacitor 4 and the electrolytic capacitor 7 for removing a high frequency component has been described. However, the present invention may be similarly applied to a circuit configuration in which, as in the conventional technique, power is supplied from the battery 1 to the load F1 in which the capacitor 4 and the electrolytic capacitor 7 are connected in parallel, and similar advantages can be obtained.

This case may be applied to both a primary battery such as an alkaline battery that cannot be charged and a secondary battery such as a lead storage battery that can be charged as the battery 1.

INDUSTRIAL APPLICABILITY

The circuit for preventing inrush current of the present invention can completely disconnect the battery from the charger with the plugs. Further, it can significantly reduce inrush current without a switch operation. For example, the present invention is useful for the reducing technique of inrush current in a charger for charging a large-capacitance battery mounted in an electric vehicle.

The invention claimed is:

1. A circuit for preventing inrush current that prevents inrush current generated in connection between a battery and a charger, the charger being connected via a contact portion to the battery to charge the battery through the contact portion, the circuit comprising:

between the charger and the contact portion,
a series circuit including a resistor and a capacitor, the series circuit being connected in parallel with an output end of the charger; and
a coil connected to the output end of the charger in series with the battery,
wherein the circuit for preventing inrush current is configured to prevent the inrush current in the charger connected to the battery via the contact portion including a first plug provided on a side of the battery and a second plug provided on a side of the charger.

2. The circuit for preventing inrush current according to claim 1, wherein the circuit for preventing inrush current is configured to prevent the inrush current in the charger including a capacitor for removing a high frequency component connected in parallel with the output end.

3. A circuit for preventing inrush current that prevents inrush current generated in connection between a battery and a load, the load being connected via a contact portion to the battery and receiving power from the battery through the contact portion, the circuit comprising:

between the load and the contact portion,
a series circuit including a resistor and a capacitor, the series circuit being connected in parallel with a power supply end of the load; and
a coil connected to the power supply end of the load in series with the battery,
wherein the circuit for preventing inrush current is configured to prevent the inrush current in the load connected to the battery via the contact portion including a first plug provided on a side of the battery and a second plug provided on a side of the load.

4. The circuit for preventing inrush current according to claim 3, wherein
the circuit for preventing inrush current is configured to prevent the inrush current in the load including a capacitor for removing a high frequency component connected in parallel with the power supply end.

5. The circuit for preventing inrush current according to claim 1, wherein the coil is an open magnetic circuit coil.

6. The circuit for preventing inrush current according to claim 3, wherein the coil is an open magnetic circuit coil.

* * * * *